US012587973B2

(12) United States Patent
Yao et al.

(10) Patent No.: US 12,587,973 B2
(45) Date of Patent: Mar. 24, 2026

(54) SYSTEMS AND METHODS FOR REPORTING POWER-RELATED INFORMATION

(71) Applicant: ZTE CORPORATION, Shenzhen (CN)

(72) Inventors: Ke Yao, Shenzhen (CN); Bo Gao, Shenzhen (CN); Chuangxin Jiang, Shenzhen (CN); Zhaohua Lu, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 296 days.

(21) Appl. No.: 18/240,068

(22) Filed: Aug. 30, 2023

(65) Prior Publication Data

US 2025/0081124 A1 Mar. 6, 2025

Related U.S. Application Data

(63) Continuation of application No. PCT/CN2021/093053, filed on May 11, 2021.

(51) Int. Cl.
| | |
|---|---|
| *H04W 52/42* | (2009.01) |
| *H04W 52/14* | (2009.01) |
| *H04W 52/36* | (2009.01) |
| *H04W 72/044* | (2023.01) |

(52) U.S. Cl.
CPC ......... *H04W 52/365* (2013.01); *H04W 52/42* (2013.01); *H04W 72/046* (2013.01)

(58) Field of Classification Search
CPC . H04W 52/365; H04W 52/42; H04W 52/146; H04W 52/367; H04W 72/04
See application file for complete search history.

(56) References Cited

U.S. PATENT DOCUMENTS

| | | | | |
|---|---|---|---|---|
| 12,192,841 | B2 * | 1/2025 | Noh | H04L 1/08 |
| 12,507,180 | B2 * | 12/2025 | Hakola | H04W 52/365 |
| 2010/0296471 | A1 | 11/2010 | Heo et al. | |
| 2018/0183507 | A1 * | 6/2018 | Franz | H04B 7/0626 |
| 2019/0081687 | A1 * | 3/2019 | Sadiq | H04B 7/0408 |
| 2019/0230544 | A1 * | 7/2019 | Zhu | H04W 72/12 |

(Continued)

FOREIGN PATENT DOCUMENTS

| | | |
|---|---|---|
| EP | 3 911 034 A1 | 11/2021 |
| WO | WO-2020/143761 A1 | 7/2020 |

OTHER PUBLICATIONS

Huawei et al., "On MPE enhancement for Rel-16" 3GPP TSG-RAN WG4 Meeting #93, R4-1915383, Nov. 22, 2019, Reno, USA (4 pages).

(Continued)

*Primary Examiner* — Jenee Holland

(74) *Attorney, Agent, or Firm* — Foley & Lardner LLP

(57) ABSTRACT

A wireless communication method includes receiving, by a wireless communication device from a network, an indication of a candidate beam set comprising a first number of beam states; determining, by the wireless communication device, a second number of power-related information, each of which corresponds to a beam state in a reporting beam set determined based on the candidate beam set; and sending, by the wireless communication device to the network, a report comprising the power-related information, wherein at least one of the first number or the second number is a positive integer.

15 Claims, 2 Drawing Sheets

(56)                References Cited

U.S. PATENT DOCUMENTS

| | | | | |
|---|---|---|---|---|
| 2019/0372644 A1* | 12/2019 | Chen | .................... | H04B 7/0695 |
| 2020/0112926 A1 | 4/2020 | Laghate et al. | | |
| 2020/0245264 A1 | 7/2020 | Iwai et al. | | |
| 2020/0314764 A1* | 10/2020 | Noh | ...................... | H04B 7/0617 |
| 2021/0226689 A1* | 7/2021 | Farag | ................. | H04B 7/06952 |
| 2021/0243743 A1* | 8/2021 | Bai | ........................ | H04W 72/21 |
| 2021/0297959 A1* | 9/2021 | Zhou | .................... | H04B 1/3838 |
| 2022/0046740 A1* | 2/2022 | Lo | ........................... | H04W 24/10 |
| 2022/0103419 A1* | 3/2022 | Zhou | .................... | H04L 41/0654 |
| 2022/0116891 A1* | 4/2022 | Yao | ........................ | H04W 52/42 |
| 2022/0239437 A1* | 7/2022 | Matsumura | ........ | H04B 7/06964 |
| 2022/0295303 A1* | 9/2022 | Takada | ................... | H04B 7/088 |
| 2022/0322113 A1* | 10/2022 | Zhang | ................... | H04B 7/088 |
| 2022/0337305 A1* | 10/2022 | Wu | .................... | H04B 7/06964 |
| 2022/0353036 A1* | 11/2022 | Gao | ...................... | H04L 1/1812 |
| 2022/0368509 A1* | 11/2022 | He | ........................ | H04B 7/0617 |
| 2023/0040162 A1* | 2/2023 | Yuan | .................... | H04B 7/0695 |
| 2023/0083588 A1* | 3/2023 | Matsumura | ......... | H04W 52/146 |
| | | | | 455/522 |
| 2023/0094729 A1* | 3/2023 | Abedini | ............ | H04W 72/0473 |
| | | | | 370/329 |
| 2023/0113530 A1* | 4/2023 | He | ....................... | H04B 7/0695 |
| | | | | 370/330 |
| 2023/0319786 A1* | 10/2023 | Zheng | .................. | H04L 5/0053 |
| | | | | 370/329 |
| 2023/0403064 A1* | 12/2023 | Yao | .......................... | H04L 5/001 |
| 2024/0031826 A1* | 1/2024 | He | ........................ | H04B 7/0695 |
| 2024/0049189 A1* | 2/2024 | Gao | ........................ | H04B 7/088 |
| 2024/0236722 A1* | 7/2024 | Yuan | .................. | H04B 7/06964 |
| 2024/0275533 A1* | 8/2024 | Zhang | ................... | H04L 5/0053 |
| 2024/0429973 A1* | 12/2024 | Yuan | .................... | H04B 7/0695 |

OTHER PUBLICATIONS

International Search Report and Written Opinion for PCT Appl. No. PCT/CN2021/093053, mailed Feb. 14, 2022 (9 pages).

Nokia et al., "Enhancements on Multi-beam Operation" 3GPP TSG RAN WG1 #104-bis-e, R1-2103365, Apr. 20, 2021, e-Meeting (40 pages).

ZTE, "Enhancements on multi-beam operation" 3GPP TSG RAN WG1 Meeting #96bis, R1-1904014, Apr. 12, 2019, Xi'an, China (17 pages).

3rd Generation Partnership Project; Technical Specification Group Radio Access Network; NR; Medium Access Control (MAC) protocol specification (Release 16), 3GPP TS 38.321 V16.4.0 (Mar. 2021), 157 pages.

Extended European Search Report for EP Appl. No. 21941254.1, dated Jul. 1, 2024 (11 pages).

Communication pursuant to Article 94(3) EPC for EP Appl. No. 21941254.1, dated Sep. 29, 2025 (7 pages).

* cited by examiner

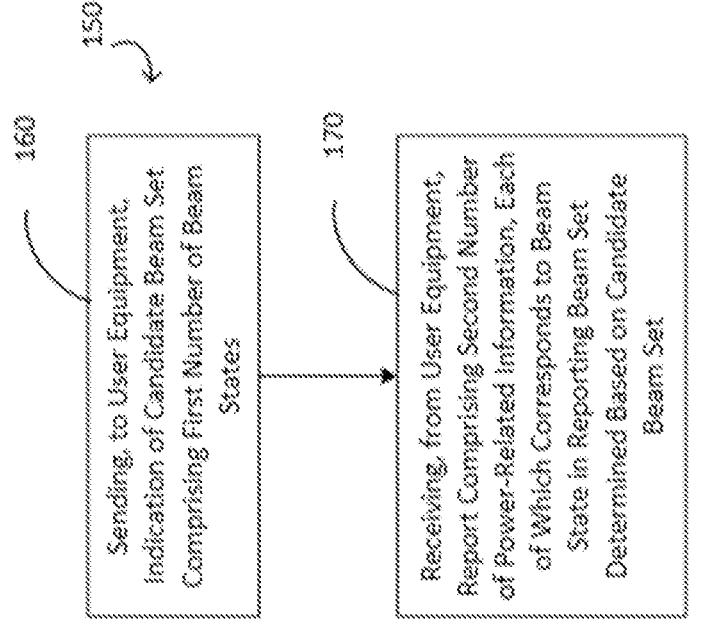

*150*

*160*
Sending, to User Equipment, Indication of Candidate Beam Set Comprising First Number of Beam States

*170*
Receiving, from User Equipment, Report Comprising Second Number of Power-Related Information, Each of Which Corresponds to Beam State in Reporting Beam Set Determined Based on Candidate Beam Set

FIG. 1B

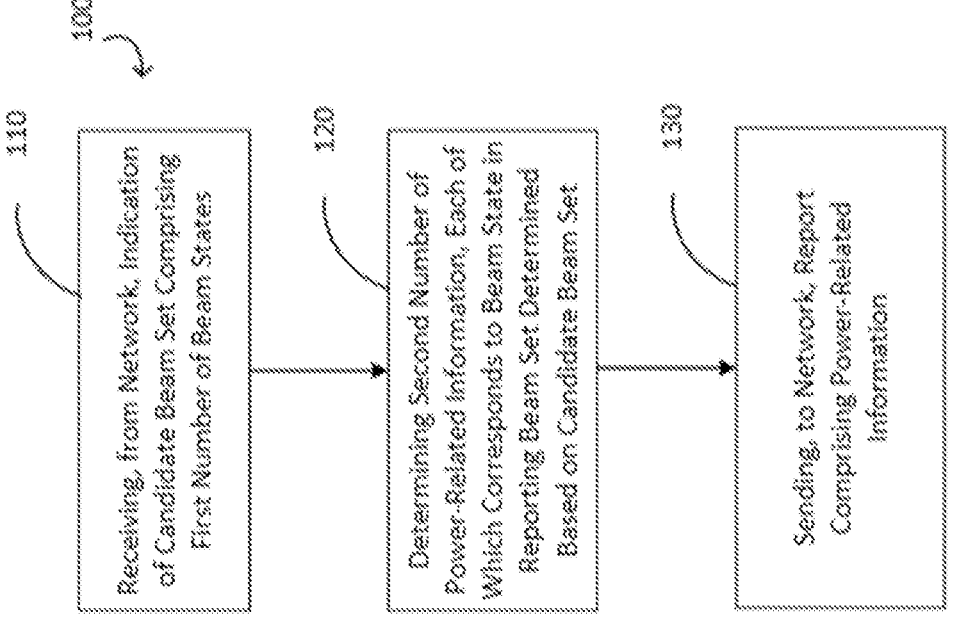

*100*

*110*
Receiving, from Network, Indication of Candidate Beam Set Comprising First Number of Beam States

*120*
Determining Second Number of Power-Related Information, Each of Which Corresponds to Beam State in Reporting Beam Set Determined Based on Candidate Beam Set

*130*
Sending, to Network, Report Comprising Power-Related Information

FIG. 1A

SYSTEMS AND METHODS FOR REPORTING POWER-RELATED INFORMATION

CROSS-REFERENCE TO RELATED APPLICATION

This application claims the benefit of priority under 35 U.S.C. § 120 as a continuation of International Patent Application No. PCT/CN2021/093053, filed on May 11, 2021, the disclosure of which is incorporated herein by reference in its entirety.

TECHNICAL FIELD

The disclosure relates generally to wireless communications and, more particularly, to systems and methods for reporting power-related information.

BACKGROUND

One of the key features of the New Radio (NR) technology of Fifth Generation (5G) mobile communication systems is the support of high frequency bands. High frequency bands have abundant frequency domain resources, but wireless signals in high frequency bands decay quickly and coverage of the wireless signals becomes small. Thus, transmitting signals in a beam mode is able to concentrate energy in a relatively small spatial range and to improve the coverage of the wireless signals in the high frequency bands. In the beam scenario, as the time and position change, a beam pair between a Base Station (BS) and a User Equipment (UE) may also change. Thus, a flexible beam update mechanism is required.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In some arrangements, User Equipment (UE) performs a method including receiving, from a Network, an indication of a candidate beam set comprising a first number of beam states; determining a second number of power-related information, each of which corresponds to a beam state in a reporting beam set determined based on the candidate beam set; and sending, to the Network, a report comprising the power-related information, wherein at least one of the first number or the second number is a positive integer.

In other arrangements, the Network performs a method including sending, to a UE, an indication of a candidate beam set comprising a first number of beam states; and receiving, from the UE, a report comprising a second number of power-related information, wherein each of the power-related information corresponds to a beam state in a reporting beam set determined based on the candidate beam set, and wherein at least one of the first number and the second number is a positive integer.

In other embodiments, a wireless communications apparatus comprising a processor and a memory, wherein the processor is configured to read code from the memory and implement a method including receiving, from a network, an indication of a candidate beam set comprising a first number of beam states; determining a second number of power-related information, each of which corresponds to a beam state in a reporting beam set determined based on the candidate beam set; and sending, to the network, a report comprising the power-related information, wherein at least one of the first number or the second number is a positive integer.

In other embodiments, a computer program product comprising a computer-readable program medium code stored thereupon, the code, when executed by a processor, causing the processor to implement a method including receiving, from a network, an indication of a candidate beam set comprising a first number of beam states; determining a second number of power-related information, each of which corresponds to a beam state in a reporting beam set determined based on the candidate beam set; and sending, to the network, a report comprising the power-related information, wherein at least one of the first number or the second number is a positive integer.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 1A is a flowchart diagram illustrating an example wireless communication method for reporting power-related information, according to various embodiments.

FIG. 1B is a flowchart diagram illustrating another example wireless communication method for reporting power-related information, according to various embodiments.

DETAILED DESCRIPTION

Figure 2B:
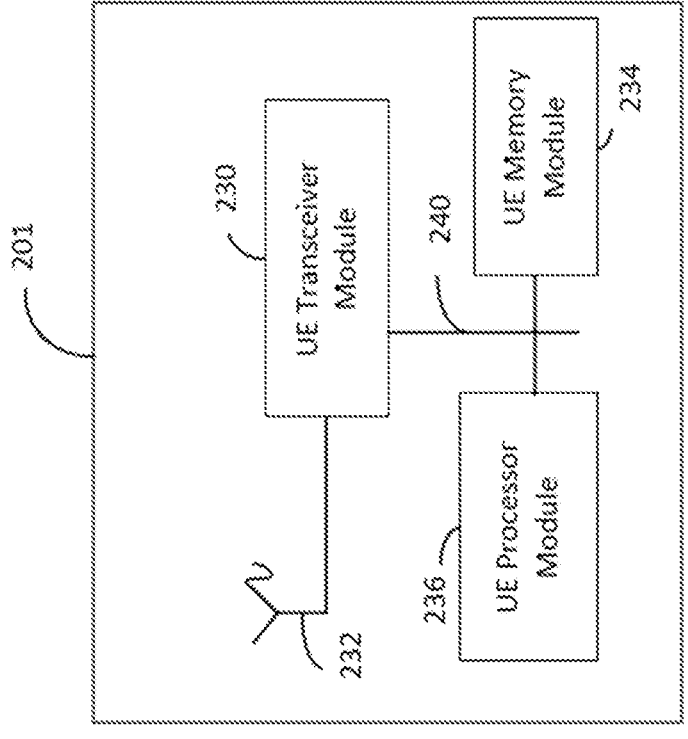
FIG. 2B illustrates a block diagram of an example device, according to various embodiments.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

In 5G New Radio (NR), when more than one Maximum Permissible Exposure (MPE) and/or Power Headroom Report (PHR) is supported for more than one candidate beam, the beams corresponding to each MPE and/or PHR should be identified, but there is no mechanism currently defined for beam or panel identification for beam-specific MPE and/or PHR. When multiple MPE are supported for candidate beams, a current 2-bit MPE field cannot be used for small MPE (e.g., <3 dB). Furthermore, in current technology, a set of power control parameters can be assumed in order to determine a Virtual-PHR (V-PHR), but the same mechanism is not suitable for multiple V-PHRs for multiple candidate beams. Finally, while Path-Loss Reference Signal (PL-RS) can be shared among Component Carriers (CCs) in a CC group, MPE and PHR can only be reported per individual CC, which causes a large overhead. The systems and methods herein describe solutions to these issues.

In a scenario with multiple beams, transmission is related to a certain beam. When a NR Node B (gNB) transmits a Downlink (DL) transmission to a UE, the gNB indicates the transmit beam of the DL transmission (e.g., by a Transmission Configuration Indicator (TCI) state that comprises one or two Reference Signals (RSs)) to a User Equipment (UE) to let the UE know how to receive the DL transmission. Similarly, when a gNB schedules a UE to transmit a UL transmission, the gNB also indicates a RS to let UE know how to transmit the UL transmission. For a UL transmission, the gNB (or network) typically controls the transmit power to be high enough to ensure a sufficient receive power level but low enough to avoid introducing excess interference.

Uplink (UL) transmission Power Control (PC) is defined by several basic principles. A required transmit power for a UL transmission (i.e., occasion) is determined by at least one of: a) Path-Loss (PL); b) target receive power (noted as P0 or Po); c) a coefficient of PL value (noted as alpha or a); d) Closed-Loop Power Control (CLPC); or e) power adjustment, which is related to Modulation and Coding Scheme (MCS), Subcarrier Space (SCS), or number of scheduling Resource Blocks (RB). $P_{CMAX}$ is determined according to a power class-related maximum power and a Maximum Power Reduction (MPR), which includes at least one of the multiple types of MPR, including MPR, Additional MPR (A-MPR), or Power Management MPR (P-MPR). From there, an actual (or real) transmit power is given as the minimum of the required transmit power and $P_{CMAX}$. Finally, Maximum Permissible Exposure (MPE) is represented by a P-MPR level reported from User Equipment (UE) to the network (e.g., gNB), a value of the MPE indicates the applied power backoff to meet MPE requirements.

If a UE transmits a Physical Uplink Shared Channel (PUSCH) on an active UL Bandwidth Part (BWP) b of a carrier f of a serving cell c using a parameter set configuration with an index j and PUSCH power control adjustment state with an index l, the UE then determines the PUSCH transmission power in a PUSCH transmission occasion i as:

$$P_{PUSCH,b,f,c}(i, j, q_d, l) =$$

$$\min\left\{\begin{array}{l} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array}\right\}$$

where $P_{CMAX,f,c}(i)$ is a UE-configured maximum power output for a carrier f of serving cell c in PUSCH transmission occasion i. The value for $P_{CMAX,f,c}$ is set such that a corresponding measured peak Equivalent Isotropically Radiated Power (EIRP) $P_{CMAX,f,c}$ is within the bounds established by:

$$P_{Powerclass} - MAX\left(MAX\left(MPR_{f,c}, A{-}MPR_{f,c}\right) + \Delta MB_{P,n}, P{-}MPR_{f,c}\right) -$$

$$MAX\{T(MAX(MPR_{fc}, A{-}MPR_{f,c})), T(P{-}MPR_{f,c})\} \leq P_{UMAX,f,c} \leq$$

$$EIRP_{max}$$

while the corresponding measured total radiated power $P_{CMAX,f,c}$ is bounded by:

$$P_{TMAX,f,c} \leq TRP_{max}$$

P-MPR$_{f,c}$ is defined as an allowed maximum output power reduction. The UE applies P-MPR$_{f,c}$ for a carrier f of serving cell c only in the following situations (note that for UE conformance testing, P-MPR$_{f,c}$ is 0 dB): a) ensuring compliance with applicable electromagnetic power density exposure requirements and addressing unwanted emissions and self-defense requirements in case of simultaneous transmissions on multiple Radio Access Technology (RAT) for scenarios outside the scope of 3GPP RAN specifications; or b) ensuring compliance with applicable electromagnetic power density exposure requirements in case of proximity detection is used to address such requirements that require a lower maximum output power.

A PHR Medium Access Control Control Element (MAC-CE) is defined by the following parameters: a) $C_i$, which indicates the presence of a Power Headroom (PH) field for the Serving Cell with ServCellIndex. The $C_i$ field set to 1 indicates that a PH field for the Serving Cell with ServCellIndex i is reported. The $C_i$ field set to 0 indicates that a PH field for the Serving Cell with ServCellIndex i is not reported; b) R, which is the reserved bit and is set to 0; c) V, which indicates if the PH value is based on a real transmission or a reference format. For a type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted; d) PH, which indicates the PH level. The length of the field is 6 bits; e) P, which indicates the applied power backoff to meet MPE requirements if mpe-Reporting is configured. Otherwise (i.e., if mpe-Reporting is not configured, P indicates whether the MAC entity applies power backoff due to power management. The MAC entity sets P to 1 if the corresponding $P_{CMAX,f,c}$ field would have had a different value if no power backoff due to power management had been applied; f) $P_{CMAX,f,c}$, which (if present) indicates the $P_{CMAX,f,c}$ for the NR Serving Cell and the $P_{CMAX,f,c}$ or $P_{CMAX,f,c}$ for the Evolved Universal Terrestrial Radio Access (E-UTRA) Serving Cell used for calculating the preceding PH field; and g) MPE, which indicates the applied power backoff to meet MPE requirements if mpe-Reporting is configured. The length of MPE field is 2 bits. Otherwise (i.e., if mpe-Reporting is not configured or if the P field is set to 0), R bits are present instead.

Currently, MPE is reported per CC, such that there is only one value of MPE for each CC. The gNB (i.e., network) may have knowledge about whether the beam related to the reported MPE is good, but the gNB has no information about the MPE of other beams, which is especially true for candidate beams. In order to exploit better performance for scenarios in which there are multiple beams, measurements, such as those for MPE and PHR, should be deployed per beam and reported for more than one beam. For example, more than one MPE and/or PHR should be reported for a single CC, with each MPE and/or PHR corresponding to a beam. As used herein, 'beam' is also referred to as a beam state, which comprises at least one of: a) Quasi Co-Location (QCL) information; b) TCI state; c) spatial relation information; d) RS information; e) RS set information; f) antenna group information; g) information of port group or antenna port group; h) information of panel or antenna panel; i) information of Transmission and Reception Point (TRP); j) spatial filter information; or k) precoding information.

In a first embodiment, a beam related to MPE or PHR is identified based on a candidate Transmission Configuration Indicator (TCI) state set. For enhanced P-MPR and virtual PHR, MPE and/or PHR is typically reported in a MAC-CE. When more than one MPE and/or PHR is supported for more than one beam, the corresponding beams should be identified, but there is no method for such beam identification for beam-specific MPE and/or PHR in current technology.

The candidate TCI state set is a set of TCI states activated by a MAC-CE or configured by a higher layer parameter (e.g., Radio Resource Control (RRC) signaling). Beam-specific MPE and/or PHR can be reported for each beam state in a reporting TCI state set. The reporting TCI state sets can be all of or part of the TCI states in the corresponding candidate TCI state set. The reporting TCI state sets can be indicated by a bitmap in which each bit corresponds to a TCI state in the candidate TCI state set, with a bit value of 1 meaning that the corresponding TCI state is indicated. In some scenarios in which the number of TCI states in the reporting TCI state set is not large, the reporting TCI state can be indicated by identification of each individual TCI state rather than by a bitmap.

If scheduling information (also referred to as grant information) is in place for a beam for UL transmission, the scheduling information is used to determine at least one of PH, $P_{CMAX}$, or MPE. In this case, the PH is referred to as a Real PH, actual PH, or a non-virtual PH. Power headroom report (PHR) can also be referred as power headroom (PH). The PHR, corresponding $P_{CMAX}$, and MPE are reported for the beam. A two-octet entry reporting is a real entry and can be given as the following table 1:

TABLE 1

| P | V | PH |
|---|---|---|
| MPE or R | | Pcmax |

If there is no scheduling information for any UL transmission (i.e., no beam has corresponding scheduling information), a pre-defined set of parameters are used to determine PH, $P_{CMAX}$, and MPE. In this case, the PH is referred to as a virtual PH. $P_{CMAX}$ is not reported because it is assumed that gNB already knows the parameters for determining the value of $P_{CMAX}$, such that only PH and MPE are reported. A virtual entry is used, and can be given as the following table 2:

TABLE 2

| MPE or R | PH |
|---|---|

In one example of this first embodiment, a UL transmission related to a beam x is scheduled, so an entry for a real PH is reported for beam x. In addition to beam x, three other beams (given as beam y1, beam y2, and beam y3) are reported for a virtual PH and MPE. As such, a single real entry and 3 virtual entries are reported in a MAC-CE. An example report is included below in Tables 3-7. Table 3 is the real entry for beam x, Table 4 is a beam indication, and Tables 5-7 are the virtual entries for beam y1, beam y2, and beam y3 respectively.

TABLE 3

| P | V | PH |
|---|---|---|
| MPE or R | | Pcmax |

TABLE 4

| Beam indication: a bitmap or other info to indicate beam y1, y2, y3 |
|---|

TABLE 5

| MPE or R | PH |
|---|---|

TABLE 6

| MPE or R | PH |
|---|---|

TABLE 7

| MPE or R | PH |
|---|---|

Because a UL transmission is scheduled, both the gNB (i.e., network) and the UE know the related beam, so beam x does not need to be specifically indicated. The number of real entries depends on the number of beams in the scheduled UL transmission. For example, as shown in FIG. 1, only one beam is related to the UL transmission, so there is only one real entry. Alternatively, if the number of beams in the candidate beam is larger than 1, beam indication may be needed. For example, if the number of beams in the candidate beam is 8, an 8-bit bitmap is used for the beam indication. The bitmap may optionally indicate a beam x (due to the UL transmission being scheduled), but entry for the beam x is not after the beam indication, regardless of whether the bitmap indicates beam x. After beam indication, a sequence of octets is generated. Each octet comprises at least one of "MPE or R" or PH. V for each octet is assumed as '1' because it is virtual, and P is assumed as '1' because MPE indication is allowed only within a pre-defined domain. An example bitmap for this 8-beam scenario is below in table 8:

TABLE 8

| Bit #7 | Bit #6 | Bit #5 | Bit #4 | Bit #3 | Bit #2 | Bit #1 | Bit #0 |
|--------|--------|--------|--------|--------|--------|--------|--------|
| 0 | 1 | 1 | 0 | 1 | 0 | 0 | 0 |
| Beam x | Beam y3 | Beam y2 | Beam z4 | Beam y1 | Beam z3 | Beam z2 | Beam z1 |

If the candidate TCI state set is a set of TCI states activated by a MAC-CE, in the case of a Single-Downlink Control Information (S-DCI) mode, each bit in the bitmap represents a UL-activated TCI state. If there is at least one TCI state in at least two codepoints of TCI state activated in a MAC-CE, the TCI state is represented by only one bit in the bitmap. In the case of Multiple-DCI (M-DCI) mode, each bit in the bitmap represents a UL TCI for CORESET-poolID 0 or 1. The total bitmap then comprises all TCI states activated for CORESETpoolID 0 or 1.

If the candidate beam set is configured by a higher layer parameter, the reported beams include at least one Synchronization Signal Block Resource Indicator (SSBRI) and/or Channel State Information (CSI). The reported SSBRI(s)/CSI(s) are indicated in the MAC-CE, which includes at least one of beam-specific MPE or beam-specific PH. For example, a bitmap can be used to indicate one or more beams from the candidate beam set, or a list of beam indication information is included in the MAC-CE.

In a second embodiment, the MPE field is re-designed for scenarios in which no P is filed. Currently, the MPE field in a MAC-CE has two bits and can indicate one of four P-MPR levels. For situations in which the MPE is reported, the P field is used to assist MPE indication. In general, if a UE selects the reporting beam for a virtual entry in order to recommend beams for future transmission, MPE values corresponding to the reported beams are not large, or beams associated with large MPE values are not selected. The MAC entity sets P to 0 if the backoff is less than P_MPR_0, and sets P to 1 otherwise. The reported values for P-MPR in MPE are associated with bounds for PMP-R (i.e., a measured quantity value of P-MPR) according to the following table 9:

TABLE 9

| Reported value | Measured quantity value | Unit |
|---|---|---|
| P-MPR 00 | 3 ≤ PMP-R < 6 | dB |
| P-MPR 01 | 6 ≤ PMP-R < 9 | dB |
| P-MPR 02 | 9 ≤ PMP-R < 12 | dB |
| P-MPR 03 | PMP-R ≥ 12 | dB |

In order to address these concerns, the MPE field is re-designed in order to associate different bounds for PMP-R with reported values for P-MPR. The following Tables 10A-B below are two examples of re-designs:

TABLE 10A

| Reported value | Measured quantity value | Unit |
|---|---|---|
| P-MPR 00 | 3 ≤ PMP-R < 6 | dB |
| P-MPR 01 | 6 ≤ PMP-R < 9 | dB |
| P-MPR 02 | PMP-R ≥ 9 | dB |
| P-MPR 03 | 0 ≤ PMP-R < 3 | dB |

TABLE 10B

| Reported value | Measured quantity value | Unit |
|---|---|---|
| P-MPR 00 | 0 ≤ PMP-R < 3 | dB |
| P-MPR 01 | 3 ≤ PMP-R < 6 | dB |
| P-MPR 02 | 6 ≤ PMP-R < 9 | dB |
| P-MPR 03 | PMP-R ≥ 9 | dB |

In a third embodiment, PC parameters are determined for beam-specific MPE and/or virtual PHR according to a corresponding beam rather than according to a pre-defined set of PC parameters. Currently, when there is no UL transmission, a virtual PH is reported with pre-defined PC parameters. These PC parameters include at least one of: a) open-loop PC parameters (e.g., target receiving power, P0, coefficient of PL, alpha); b) closed-loop PC parameters (e.g., closed-loop PC index, number of closed-loop PC loops); or c) PL parameters (e.g., reference signal for PL evaluation).

For PUSCH transmission, PC parameters can be determined by the beam related to the specific PUSCH transmission, such as an SRS resource indicator or TCI state indicator. Association between beam and PC parameters is configured by higher layer parameters (e.g., RRC signaling). For example, a set of candidate beams are configured to be associated with PC parameters, with each beam associated with a set of PC parameters. For Physical Uplink Control Channel (PUCCH) transmission, PC parameters can be determined by the beam related to the PUCCH transmission, such as PUCCH spatial relation or TCI state indicator. For example, for a beam xN, virtual PH is determined by PC parameters associated with beam xN. When there is no UL transmission, a virtual PH is determined according to an assumed parameter of P-MPR as MPE-MPR rather than as P-MPR=0 dB.

In a fourth embodiment, at least one of MPE, PH, or $P_{CMAX}$ is reported specifically for individual panels when the UE supports more than one panel. Here, a real entry or a virtual entry can be related to a panel, and either entry may be related to a beam for a panel. The related beam can either be indicated explicitly or not indicated at all. If no beam is explicitly indicated, there are X entries in a MAC-CE for a certain CC, where X is equal to either a number of panels supported by the UE or a number of active panels of the UE for a certain CC. These X entries correspond to multiple panels in an increasing or decreasing order, and each entry can be either real or virtual depending on whether the beam of the corresponding panel has scheduling information for a UL transmission. For example, if X is equal to 2, there are 2 entries, and the 2 entries can be both real, both virtual, or 1 real and 1 virtual.

In a fifth embodiment, a value for MPE is reported for a CC group, such that the MPE is CC group-specific. In a Carrier Aggregation (CA) scenario, there is at least one CC (also referred to as a serving cell). Quasi-Collocation (QCL) type D reference signal (or spatial relation) can be shared among CCs within a CC group. PL is determined by a PL-RS related primarily to the QCL type D property, so PL can similarly be shared among CCs. Other PC parameters (e.g., P0, alpha, CL-PC) can also be CC-specific or CC group-specific. When closed loop PC parameters are configured as CC group-specific, a value for f(l) can be shared among CCs, with l being a closed loop index (e.g., 0, 1). TPC commands for all CCs within the CC group can be applied for f(l), based on an ending of the PDCCH that carries DCI with the TPC command.

FIG. 1A is a flowchart diagram illustrating an example wireless communication method 100, according to various arrangements. Method 100 can be performed by a User Equipment (UE) and begins at 110 when the UE receives, from a network (e.g., Base Station (BS)), an indication of a candidate beam set comprising a first number of beam states. At 120, the UE determines a second number of power-related information, each of which corresponds to a beam state in a reporting beam set determined based on the candidate beam set, and at 130, the UE sends, to the network, a report comprising the power-related information. At least one of the first number or the second number is a positive integer. "Power-related information" can be a set of values, such as any combination of MPE, PHR, RSRP, Pcmax, etc.

In some embodiments, either each of the second number of power-related information comprises at least one of a Maximum Permissible Exposure (MPE), maximum transmit power (i.e. Pcmax), Reference Signal Receiving Power (RSRP) (or Layer 1-RSRP (L1-RSRP)), or Power Headroom Report (PHR), or the candidate beam set is activated by a MAC CE or configured by a RRC signaling. The MPE value or field indicates the applied power backoff to meet MPE requirements Power headroom report (PHR) can also be referred as power headroom (PH).

In some embodiments, power-related information should comprise at least PHR or MPE for a CC, or power-related information may comprise a number of PHR, each corresponding to a beam state in the reporting beam set, e.g. for a CC. In other embodiments, power-related information may comprise a number of MPE and RSRP (or L1-RSRP), with each MPE and RSRP corresponding to a beam state in the reporting beam set e.g. for a CC. Power-related information may also comprise PHR and MPE for a CC. Further, power-related information may comprise a number of MPE and PHR, with each MPE and PHR corresponding to a beam state in the reporting beam set e.g. for a CC.

In some embodiments, the reporting beam set is determined based on the candidate beam set comprising at least one of: the reporting beam set is determined as the candidate beam set (i.e., the candidate beam set is the same as the reporting beam set); or the reporting beam set is determined by an indication of a reporting beam set in the report.

In some of these embodiments, the reporting beam set is determined as the candidate beam set, in response to determining at least one of the following conditions is satisfied: a) the UE is configured to report power-related information for all beam states in the candidate beam set; b) absence of the indication of a reporting beam set in the report that is configured by a RRC signaling or indicated in a MAC CE; or c) the first number is less than or equal to a predefined number or a configured number (e.g., 2 or 4). The configured number may depend on UE capability. In further of these embodiments, the indication of the reporting beam set in the report comprises at least one of: a) a bitmap with the first number of bits, with each bit corresponding to a beam state in the candidate beam set; or b) a list of beam state indicators, with each beam state indicator indicating a beam state in the candidate beam set. In some of these embodiments, a number of bits with value of "1" in the bitmap is equal to the second number; or a number of the beam indicator in the list of beam indicator is equal to the second number.

In some embodiments, the PHR of the power-related information corresponding to a beam state of the reporting beam set is determined based on at least one of: a) a pathloss (PL) determined by a RS for PL evaluation related to the beam state, which may be pre-configured for beam state and RS for PL evaluation (or measurement). Further, the relation between beam state and the factor (e.g., FS for RSRP evaluation, target receive power, coefficient of PL, or closed-loop power control parameter) is similarly pre-configured; b) a PL determined by a RS for RSRP evaluation related to the beam state. The value here can be determined according to L1-RSRP results that correspond to beam state in the reporting beam set; c) a target receive power related to the beam state; d) a predefined or a certain configured target receive power. If there is no target receive power related to the beam state, a predefined target receive power (e.g. 0 dBm) or a certain configured target receive power (e.g. the first target receive power in a configured target receive power pool) is used; e) a coefficient of PL related to the beam state. If there is no coefficient of PL related to the beam state, a predefined coefficient of PL (e.g. 1) or a certain configured coefficient of PL (e.g. the first coefficient of PL in a configured coefficient of PL pool) is used; f) a predefined or a certain configured coefficient of PL; g) a closed-loop power control parameter related to the beam state (e.g., closed-loop power control index, transmission power control adjustment state); or h) a maximum transmit power (i.e., Pcmax) with assumption of a MPR which is equal to or larger than a MPE corresponding to the beam state.

In other embodiments, the PHR of the power-related information corresponding to a beam state of the reporting beam set is determined based on a UL transmission, in response to determining that the UL transmission related to the beam state is transmitted within or overlapping with a time period. For example, if a UL transmission is scheduled or activated with the beam state as a UL grant or scheduling information, the transmit parameters (e.g., precoding information, TPMI, etc.) for the UL transmission is determined according to the beam state. The time period is determined according to a transmission time of the report, and may the slot in which the report is carried.

In further embodiments, the PHR of the power-related information corresponding to a beam state of the reporting beam set is determined based on a reference transmission in response to determining that no UL transmission related to the beam state is transmitted within or overlapping with a time period.

In some embodiments, a maximum transmit power of the power-related information corresponding to a beam state of the reporting beam set is determined based on an assumption of a MPR which is equal to or larger than the MPE corresponding to the beam state. In other embodiments, a value of MPE is determined based on MPE mode 1, or MPE mode 2. In MPE mode 1, a value of MPE is one MPE value in a first MPE value set, and each MPE value in a first MPE value set corresponds to one range of a first predefined range set. In MPE mode 2, a value of MPE is one MPE value in a second MPE value set, and each MPE value in a second MPE value set corresponds to one range of a second predefined range set. In some of these embodiments, the first predefined range set covers a range of values from a positive number X to a positive infinite number, and the second predefined range set covers a range of values from 0 to a positive infinite number. For example, in currently defined MPE values, the 2-bit MPE field can only indicate a range from 3 to positive infinity, such that another field ("P") is used to indicate a range from 0 to 3.

In some of these embodiments, the method 100 further comprises, in response to determining that an information for a MPE field is used to indicate a value range from 0 to X (X is not inclusive), determining MPE mode 1 for the MPE field, and, in response to determining that no information for a MPE field is used to indicate a value range from 0 to X (X is not inclusive), determining MPE mode 2 for the MPE field.

In other of these embodiments, the second predefined range set comprises M ranges, and M−1 ranges in the second predefined range set have same length of range coverage for integer values of M larger than 1. For example, if the same length of coverage is 3, the second predefined range set comprises M=4 ranges: [0, 3), which means greater than or equal to 0 dB and less than 3 dB, [3, 6), [6, 9), and [9, positive infinity). In another example, if the same length of coverage is 4, the second predefined range set comprises M=4 ranges: [0, 4), [4, 8), [8, 12), and [12, positive infinity).

In some embodiments of the method 100, the indication of the candidate beam set comprises the first number of the beam states for a CC or a CC group (comprising at least one CC) in a third number of Component Carriers (CCs), the third number being a positive integer. The CC may be a cell or a serving cell, and the UE can be configured by at least one CC group, which is identified by a CC group ID. As used here, the CC refers only to active CC.

In some of these embodiments, the method 100 further comprises the UE determining the second number of the power-related information, each power-related information corresponding to a beam state in a reporting beam set determined for the CC group based on the candidate beam set of the CC group; and sending, to the network, the report comprising the power-related information for the CC group. The reporting beam set can be the same for all CC in the CC group, which means that indication of reporting beam set (if present) can be CC group-specific. Similarly, the power-related information (e.g., MPE, Pcmax, RSRP, or PHR) can also be CC group-specific. In these embodiments, because the report is for the third number of CCs, the report comprises a list of power related information set, each of which corresponds to a CC group in the third number of CCs. A power related information set comprises a second number of power related information, and the second number may be CC group specific number. In some of these embodiments, the report comprises an indication of reporting beam set for the CC group.

In other of these embodiments, the method 100 further comprises determining, by the wireless communication device, the second number of the power-related information for a CC, each of which corresponds to a beam state in a reporting beam set for the CC determined based on the candidate beam set of the CC or of the CC group comprising the CC; and sending, by the wireless communication device to the network, a report comprising the power-related information for the CC. Each of the reporting beam set and power-related information may be CC group-specific. Here, because the report is for the third number of CCs, the report comprises a list of power related information set, each of which corresponds to a CC in the third number of CCs. A power related information set comprises a second number of power related information, and the second number may be CC specific number. In some of these embodiments, the report also comprises an indication of reporting beam set for the CC. Because the report is for the third number of CCs, the report comprises a list of indication of reporting beam set, each of which corresponds to a CC in the third number of CCs.

In some embodiments, the method 100 further comprises determining the second number of the power-related information for a CC in a CC group, each power-related information for the CC in the CC group corresponding to a beam state in a reporting beam set for the CC group determined based on the candidate beam set of the CC group; and sending, to the network, a report comprising the power-related information for the CC in the CC group. Here, because the report is for the third number of CCs, the report comprises a list of power related information set, each of which corresponds to a CC in the third number of CCs. A power related information set comprises a second number of power related information, and the second number may be a CC specific number. In some of these embodiments, the report comprises an indication of reporting beam set for the CC group. Here, because the report is for the third number of CCs, the report comprises a list of indication of reporting beam set, each of which corresponds to a CC group in the third number of CCs. Each reporting beam set corresponds to a list of power-related information set, and all of the power-related information set have same second number of power-related information. Each of the second number of power-related information corresponds to a beam state in the corresponding reporting beam set In any of these embodiments, the number of field of PHR, MPE, RSRP, or maximum transmit power of power-related information for a CC or a CC group in the report is determined according to the number of beam states in the reporting beam set for the CC or the CC group.

In some embodiments of the method 100, the beam state comprises at least one of: a) a quasi co-location (QCL) information; b) a transmission configuration indicator (TCI) state; c) spatial relation information; d) reference signal (RS) information, e) RS set information, f) antenna group information, g) information of port group or antenna port group, h) information of panel or antenna panel, i) information of transmit receive point (TRP), j) spatial filter information, or k) precoding information.

In some embodiments, the second number of the power-related information for the CC group are determined based on one CC within the CC group. In some of these embodiments, the one CC within the CC group is determined according to at least one of a CC identifier (e.g. lowest or highest CC ID in a group of CCs), a SpCell (e.g. Primary Cell, Primary Secondary Cell, or PUCCH SCell), or a real uplink transmission on a CC related to a time period (e.g., a UL transmission within the time period, or a UL transmission overlapping with the time period). In some of these embodiments, the time period is determined according to a transmit time of the report. In other of these embodiments, the method 100 further comprises, in response to determining that there are multiple real uplink transmissions related to a time period, determining the one CC as the CC with the earliest starting time transmission; or determining the one CC as the CC with lowest CC identifier among multiple CCs which have same starting time for at least one real uplink transmission.

In some embodiments, the MPE comprises at least one of: a) a power backoff, b) a power reduction, c) a power management-maximum power reduction (P-MPR), or d) MPE-maximum power reduction (MPE-MPR).

In some embodiments, the report can be carried in a MAC CE. Multi-beam enhancement for single CC is performed according to the following example MAC CE shown in Table 11:

TABLE 11

| indication of reporting beam set | | | |
|---|---|---|---|
| bit#7 | . . . | bit#1 | bit#0 |
| power-related information for 1st reporting beam state | | | |
| power-related information for 2nd reporting beam state | | | |
| . . . | | | |
| power-related information for last reporting beam state | | | |

The field of "indication of reporting beam set" or "power-related information for $1^{st}$, $2^{nd}$ or last reporting beam state" may occupy a number of bits or bytes (or octets). In the example Table 11, although each of these fields occupies one byte, this sizing is only one example, as the number of bits/bytes for each field depends on the content and size for the field.

The power-related information comprises at least one of MPE, PHR, Pcmax, or RSRP. For each beam state, power-related information can be described as an entry. There are different types of entries depending on the content of the power-related information (i.e., the specific combination of parameters). Tables 12A-D show four different entry types. The type of power-related information for each beam state can be same or different. As shown here, Table 12A is for entry type 1, Table 12B is for entry type 2, Table 12C is for entry type 3, and Table 12D is for entry type 4.

TABLE 12A

| bit#7 | | . . . | | bit#1 | bit#0 |
|---|---|---|---|---|---|
| P | V | | | PH | |
| | MPE | | | Pcmax | |

TABLE 12B

| bit#7 | | . . . | | bit#1 | bit#0 |
|---|---|---|---|---|---|
| P | V | | | PH | |
| | R | | | Pcmax | |

TABLE 12C

| bit#7 | . . . | bit#1 | bit#0 |
|---|---|---|---|
| MPE | | PH | |

TABLE 12D

| bit#7 | . . . | bit#1 | bit#0 |
|---|---|---|---|
| MPE | | RSRP | |

Reporting beam set can be implicitly determined or explicitly indicated. The indication of reporting beam set field is present for explicitly indicating reporting beam set, can be a bitmap. An example bitmap is shown in Table 13A. Alternatively, the indication of reporting beam set can be a list of beam state indicators (or indications). For each beam state indicator, information regarding a presence of next beam state is indicated, as shown in Table 13B.

TABLE 13A

| bitmap: indication of reporting beam set | | | |
|---|---|---|---|
| bit#7 | . . . | bit#1 | bit#0 |
| power-related info for 1st reporting beam state | | | |
| power-related info for 2nd reporting beam state | | | |
| . . . | | | |
| power-related info for last reporting beam state | | | |

TABLE 13B

| bit#7 | . . . | bit#1 | bit#0 |
|---|---|---|---|
| 1st beam state indication, power-related info for | | | |
| 1st beam state presence of next beam state = 1 | | | |
| 2nd beam state indication, power-related info for | | | |
| 2nd beam state presence of next beam state = 1 | | | |
| . . . | | | |
| last beam state indication, power-related info for | | | |
| last beam state presence of next beam state = 0 | | | |

For multi-beam enhancement for multiple CCs (e.g., in Carrier Aggregation (CA)), an embodiment of CC specific beam indication and CC specific power-related information in a MAC CE is shown in Table 14A.

TABLE 14A

| | bit#7 | | . . . | bit#1 | bit#0 |
|---|---|---|---|---|---|
| CC indication | C7 | | C6 C5 C4 C3 C2 C1 | | R |
| for 1st indicated CC: | indication of reporting beam set for 1st indicated CC | | | | |
| | power-related info for 1st reporting beam state | | | | |
| | power-related info for 2nd reporting beam state | | | | |
| | . . . | | | | |
| | power-related info for last reporting beam state | | | | |
| for 2nd indicated CC: | indication of reporting beam set for 2nd indicated CC | | | | |
| | power-related info for 1st reporting beam state | | | | |
| | power-related info for 2nd reporting beam state | | | | |
| | . . . | | | | |
| | power-related info for last reporting beam state | | | | |
| . . . | . . . | | | | |
| for last indicated CC: | indication of reporting beam set for last indicated CC | | | | |
| | power-related info for 1st reporting beam state | | | | |
| | power-related info for 2nd reporting beam state | | | | |
| | . . . | | | | |
| | power-related info for last reporting beam state | | | | |

An embodiment of CC group specific beam indication and CC specific power-related information in a MAC CE is shown in Table 14B.

TABLE 14B

| CC indication | | bit#7<br>C7 | ...<br>C6   C5 | C4   C3   C2   C1 | bit#1   bit#0<br>R |
|---|---|---|---|---|---|
| CC group 1 | | indication of reporting beam set for CC group 1 including 1st indicated CC | | | |
| | for 1st indicated CC in CC group 1: | power-related info for 1st reporting beam state<br>power-related info for 2nd reporting beam state<br>. . .<br>power-related info for last reporting beam state | | | |
| | . . .<br>for last indicated CC in CC group 1: | . . .<br>power-related info for 1st reporting beam state<br>power-related info for 2nd reporting beam state<br>. . .<br>power-related info for last reporting beam state | | | |
| CC group N | . . . | . . .<br>indication of reporting beam set for CC group 1 including last indicated CC | | | |
| | for 1st indicated CC in CC group N: | power-related info for 1st reporting beam state<br>power-related info for 2nd reporting beam state<br>. . .<br>power-related info for last reporting beam state | | | |
| | . . .<br>for last indicated CC in CC group N: | . . .<br>power-related info for 1st reporting beam state<br>power-related info for 2nd reporting beam state<br>. . .<br>power-related info for last reporting beam state | | | |

FIG. 1B is a flowchart diagram illustrating an example wireless communication method 150, according to various arrangements. Method 150 can be performed by a Network (e.g., a Base Station (BS)) and begins at 160 where the BS sends, to a UE, an indication of a candidate beam set comprising a first number of beam states. At 170, the BS receives, from the UE, a report comprising a second number of power-related information, wherein each of the power-related information corresponds to a beam state in a reported beam set determined based on the candidate beam set, and wherein at least one of the first number and the second number is a positive integer.

In some embodiments, at least one of the following is true: a) the power-related information comprises at least one of a Maximum Permissible Exposure (MPE), maximum output power, Reference Signal Receiving Power, or Power Headroom Reports (PHRs) for each of the at least one beam; or b) the candidate beam set is activated by a MAC CE or configured by RRC signaling.

In other embodiments, the reporting beam set is determined based on the candidate beam set comprising at least one of: a) the reporting beam set is determined as the candidate beam set; or b) the reporting beam set is determined by an indication of a reporting beam set in the report.

In some of these embodiments, the reporting beam set is determined as the candidate beam set, in response to determining at least one of the following conditions is satisfied: a) the UE is configured to report power-related information for all beam states in the candidate beam set; b) absence of the indication of a reporting beam set in the report that is configured by a RRC signaling or indicated in a MAC CE; or c) the first number is less than or equal to a predefined number or a configured number (e.g., 2 or 4). The configured number may depend on UE capability. In further of these embodiments, the indication of the reporting beam set in the report comprises at least one of: a) a bitmap with the first number of bits, with each bit corresponding to a beam state in the candidate beam set; or b) a list of beam state indicators, with each beam state indicator indicating a beam state in the candidate beam set. In some of these embodiments, a number of bits with value of "1" in the bitmap is equal to the second number; or a number of the beam indicator in the list of beam indicator is equal to the second number.

In some embodiments, the PHR of the power-related information corresponding to a beam state of the reporting beam set is determined based on at least one of: a) a pathloss (PL) determined by a RS for PL evaluation related to the beam state, which may be pre-configured for beam state and RS for PL evaluation (or measurement). Further, the relation between beam state and the factor (e.g., FS for RSRP evaluation, target receive power, coefficient of PL, or closed-loop power control parameter) is similarly pre-configured; b) a PL determined by a RS for RSRP evaluation related to the beam state. The value here can be determined according to L1-RSRP results that correspond to beam state in the reporting beam set; c) a target receive power related to the beam state; d) a predefined or a certain configured target receive power. If there is no target receive power related to the beam state, a predefined target receive power (e.g. 0 dBm) or a certain configured target receive power (e.g. the first target receive power in a configured target receive power pool) is used; e) a coefficient of PL related to the beam state. If there is no coefficient of PL related to the beam state, a predefined coefficient of PL (e.g. 1) or a certain configured coefficient of PL (e.g. the first coefficient of PL in a configured coefficient of PL pool) is used; f) a predefined or a certain configured coefficient of PL; g) a closed-loop power control parameter related to the beam state (e.g., closed-loop power control index, transmission power control adjustment state); or h) a maximum transmit power (i.e., Pcmax) with assumption of a MPR which is equal to or larger than a MPE corresponding to the beam state.

In other embodiments, the PHR of the power-related information corresponding to a beam state of the reporting beam set is determined based on a UL transmission, in response to determining that the UL transmission related to the beam state is transmitted within or overlapping with a time period. For example, if a UL transmission is scheduled or activated with the beam state as a UL grant or scheduling information, the transmit parameters (e.g., precoding information, TPMI, etc.) for the UL transmission is determined according to the beam state. The time period is determined according to a transmission time of the report, and may the slot in which the report is carried.

In further embodiments, the PHR of the power-related information corresponding to a beam state of the reporting beam set is determined based on a reference transmission in response to determining that no UL transmission related to the beam state is transmitted within or overlapping with a time period.

In some embodiments, a value of MPE is determined based on MPE mode 1, or MPE mode 2. In MPE mode 1, a value of MPE is one MPE value in a first MPE value set, and each MPE value in a first MPE value set corresponds to one range of a first predefined range set. In MPE mode 2, a value of MPE is one MPE value in a second MPE value set, and each MPE value in a second MPE value set corresponds to one range of a second predefined range set. In some of these embodiments, the first predefined range set covers a range of values from a positive number X to a positive infinite number, and the second predefined range set covers a range of values from 0 to a positive infinite number. For example, in currently defined MPE values, the 2-bit MPE field can only indicate a range from 3 to positive infinity, such that another field ("P") is used to indicate a range from 0 to 3.

In some of these embodiments, the method 150 further comprises, in response to determining that an information for a MPE field is used to indicate a value range from 0 to X (X is not inclusive), determining MPE mode 1 for the MPE field, and, in response to determining that no information for a MPE field is used to indicate a value range from 0 to X (X is not inclusive), determining MPE mode 2 for the MPE field.

In other of these embodiments, the second predefined range set comprises M ranges, and M−1 ranges in the second predefined range set have same length of range coverage for integer values of M larger than 1. For example, if the same length of coverage is 3, the second predefined range set comprises M=4 ranges: [0, 3), which means greater than or equal to 0 dB and less than 3 dB, [3, 6), [6, 9), and [9, positive infinity). In another example, if the same length of coverage is 4, the second predefined range set comprises M=4 ranges: [0, 4), [4, 8), [8, 12), and [12, positive infinity).

In some embodiments, the indication of the candidate beam set comprises the first number of the beam states for a Component Carrier (CC) or a CC group in a third number of CCs. The third number may be a positive integer.

In some of these embodiments, the second number of the power-related information for the CC group are determined based on one CC within the CC group. In some of these embodiments, the one CC in the CC group is determined according to at least one of a CC identifier, a SpCell, or a real uplink transmission on a CC related to a time period, which is determined according to a transmit time of the report. In some of these embodiments, the method 150 further comprises, in response to determining that there are multiple real uplink transmissions related to a time period, determining the one CC as the CC with the earliest starting time transmission of as the CC with a lowest CC identifier among multiple CCs with the same starting time for at least one real uplink transmission.

In some of these embodiments, the second number of the power-related information is determined, each power-related information corresponding to a beam state in a reporting beam set determined for the CC group based on the candidate beam set of the CC group; and receiving, by the BS, a report comprising the power-related information for the CC group. The reporting beam set can be the same for all CC in the CC group, which means that indication of reporting beam set (if present) can be CC group-specific. Similarly, the power-related information (e.g., MPE, Pcmax, RSRP, or PHR) can also be CC group-specific. In these embodiments, because the report is for the third number of CCs, the report comprises a list of power related information set, each of which corresponds to a CC group in the third number of CCs. A power related information set comprises a second number of power related information, and the second number may be CC group specific number. In some of these embodiments, the report comprises an indication of reporting beam set for the CC group.

In other of these embodiments, the second number of the power-related information is determined for a CC, each of which corresponds to a beam state in a reporting beam set for the CC determined based on the candidate beam set of the CC or of the CC group comprising the CC. In these embodiments, the method 150 further comprises receiving, by the BS, a report comprising the power-related information for the CC. Each of the reporting beam set and power-related information may be CC group-specific. Here, because the report is for the third number of CCs, the report comprises a list of power related information set, each of which corresponds to a CC in the third number of CCs. A power related information set comprises a second number of power related information, and the second number may be CC specific number. In some of these embodiments, the report also comprises an indication of reporting beam set for the CC. Because the report is for the third number of CCs, the report comprises a list of indication of reporting beam set, each of which corresponds to a CC in the third number of CCs.

In some embodiments, the second number of the power-related information is determined for a CC in a CC group, each power-related information for the CC in the CC group corresponding to a beam state in a reporting beam set for the CC group determined based on the candidate beam set of the CC group. In these embodiments, the method 150 further comprises receiving, by the BS, a report comprising the power-related information for the CC in the CC group. Here, because the report is for the third number of CCs, the report comprises a list of power related information set, each of which corresponds to a CC in the third number of CCs. A power related information set comprises a second number of power related information, and the second number may be a CC specific number.

In some of these embodiments, the beam state comprises at least one of: a) a quasi co-location (QCL) information; b) a transmission configuration indicator (TCI) state; c) spatial relation information; d) reference signal (RS) information, e) RS set information, f) antenna group information, g) information of port group or antenna port group, h) information of panel or antenna panel, i) information of transmit receive point (TRP), j) spatial filter information, or k) precoding information.

In other embodiments, the report comprises an indication of reporting beam set for the CC group. Here, because the report is for the third number of CCs, the report comprises a list of indication of reporting beam set, each of which corresponds to a CC group in the third number of CCs. Each reporting beam set corresponds to a list of power-related information set, and all of the power-related information set have same second number of power-related information. Each of the second number of power-related information corresponds to a beam state in the corresponding reporting beam set.

In any of these embodiments, the number of field of PHR, MPE, RSRP, or maximum transmit power of power-related information for a CC or a CC group in the report is determined according to the number of beam states in the reporting beam set for the CC or the CC group.

In some embodiments, the MPE comprises at least one of: a) a power backoff, b) a power reduction, c) a power management-maximum power reduction (P-MPR), or d) MPE-maximum power reduction (MPE-MPR).

Figure 2A:
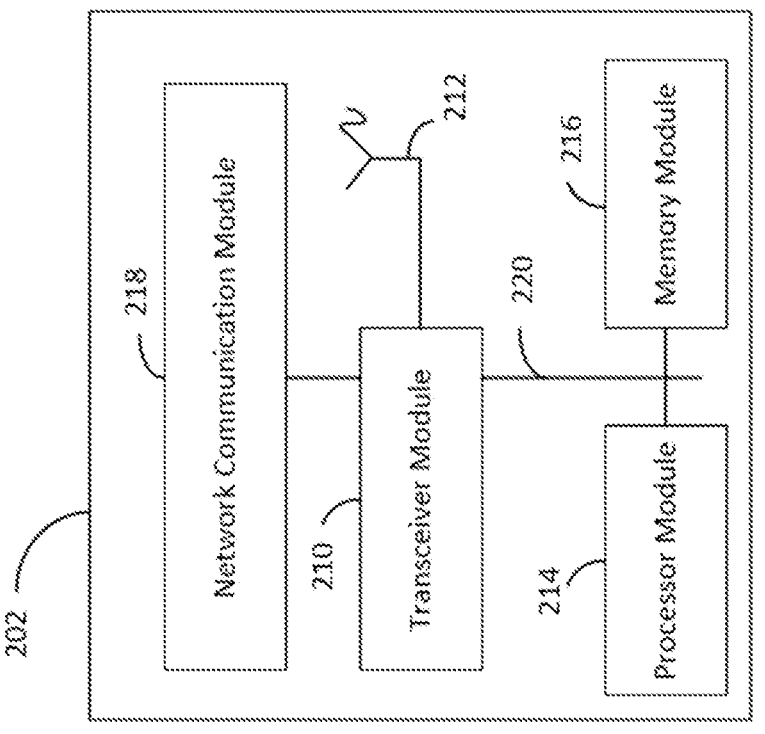
FIG. 2A illustrates a block diagram of an example Location Management Function, according to various embodiments.

FIG. 2A illustrates a block diagram of an example BS 202, in accordance with some embodiments of the present disclosure. FIG. 2B illustrates a block diagram of an example UE 201, in accordance with some embodiments of the present disclosure. The UE 201 may be a UE (e.g., a wireless communication device, a terminal, a mobile device, a mobile user, and so on) which is an example implementation of the UEs described herein, and the BS 202 may be a BS (e.g., network, serving gNB, and so on), which is an example implementation of the BS described herein.

The BS 202 and the UE 201 can include components and elements configured to support known or conventional operating features that need not be described in detail herein. In one illustrative embodiment, the BS 202 and the UE 201 can be used to communicate (e.g., transmit and receive) data symbols in a wireless communication environment, as described above. For instance, the BS 202 can be a server, a node, or any suitable computing device used to implement various network functions.

The BS 202 includes a transceiver module 210, an antenna 212, a processor module 214, a memory module 216, and a network communication module 218. The module 210, 212, 214, 216, and 218 are operatively coupled to and interconnected with one another via a data communication bus 220. The UE 201 includes a device transceiver module 230, a device antenna 232, a device memory module 234, and a device processor module 236. The modules 230, 232, 234, and 236 are operatively coupled to and interconnected with one another via a data communication bus 240. The BS 202 communicates with the UE 201 or another device via a communication channel, which can be any wireless channel or other medium suitable for transmission of data as described herein.

As would be understood by persons of ordinary skill in the art, the BS 202 and the UE 201 can further include any number of modules other than the modules shown in FIGS. 2A and 2B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the device transceiver 230 includes a radio frequency (RF) transmitter and a RF receiver each including circuitry that is coupled to the antenna 232. A duplex switch (not shown) may alternatively couple the RF transmitter or receiver to the antenna in time duplex fashion. Similarly, in accordance with some embodiments, the transceiver 210 includes an RF transmitter and a RF receiver each having circuitry that is coupled to the antenna 212 or the antenna of another BS. A duplex switch may alternatively couple the RF transmitter or receiver to the antenna 212 in time duplex fashion. The operations of the two-transceiver modules 210 and 230 can be coordinated in time such that the receiver circuitry is coupled to the antenna 232 for reception of transmissions over a wireless transmission link at the same time that the transmitter is coupled to the antenna 212. In some embodiments, there is close time synchronization with a minimal guard time between changes in duplex direction.

The device transceiver 230 and the transceiver 210 are configured to communicate via the wireless data communication link, and cooperate with a suitably configured RF antenna arrangement 212/232 that can support a particular wireless communication protocol and modulation scheme. In some illustrative embodiments, the device transceiver 230 and the transceiver 210 are configured to support industry standards such as the Long Term Evolution (LTE) and emerging 5G standards, and the like. It is understood, however, that the present disclosure is not necessarily limited in application to a particular standard and associated protocols. Rather, the device transceiver 230 and the LMF transceiver 210 may be configured to support alternate, or additional, wireless data communication protocols, including future standards or variations thereof.

The transceiver 210 and the transceiver of another device (such as but not limited to, the transceiver 210) are configured to communicate via a wireless data communication link, and cooperate with a suitably configured RF antenna arrangement that can support a particular wireless communication protocol and modulation scheme. In some illustrative embodiments, the transceiver 210 and the transceiver of another BS are configured to support industry standards such as the LTE and emerging 5G standards, and the like. It is understood, however, that the present disclosure is not necessarily limited in application to a particular standard and associated protocols. Rather, the transceiver 210 and the transceiver of another device may be configured to support alternate, or additional, wireless data communication protocols, including future standards or variations thereof.

In accordance with various embodiments, the UE 201 may be a BS such as but not limited to, an eNB, a serving eNB, a target eNB, a femto station, or a pico station, for example. The UE 201 can be an RN, a DeNB, or a gNB. In some embodiments, the UE 201 may be a UE embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 214 and 236, respectively, such that the processors modules 214 and 236 can read information from, and write information to, memory modules 216 and 234, respectively. The memory modules 216 and 234 may also be integrated into their respective processor modules 214 and 236. In some embodiments, the memory modules 216 and 234 may each include a cache memory for storing temporary variables or other intermediate information during execution of instructions to be executed by processor modules 214 and 236, respectively. Memory modules 216 and 234 may also each include non-volatile memory for storing instructions to be executed by the processor modules 214 and 236, respectively.

The network communication module 218 generally represents the hardware, software, firmware, processing logic, and/or other components of the BS 202 that enable bidirectional communication between the transceiver 210 and other network components and communication nodes in communication with the BS 202. For example, the network communication module 218 may be configured to support internet or WiMAX traffic. In a deployment, without limitation, the network communication module 218 provides an 502.3 Ethernet interface such that the transceiver 210 can communicate with a conventional Ethernet based computer network. In this manner, the network communication module 218 may include a physical interface for connection to the computer network (e.g., Mobile Switching Center (MSC)). In some embodiments, the network communication module 218 includes a fiber transport connection configured to connect the BS 202 to a core network. The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed:

1. A wireless communication method, comprising:
receiving, by a wireless communication device from a network, an indication of a candidate beam set comprising a first number of beam states;
determining, by the wireless communication device, a second number of power-related information, each of which corresponds to a beam state in a reporting beam set determined based on the candidate beam set; and
sending, by the wireless communication device to the network, a report comprising the power-related information, wherein at least one of the first number or the second number is a positive integer.

2. The method of claim 1, wherein at least one of:
each of the second number of power-related information comprises a Maximum Permissible Exposure (MPE); or
the candidate beam set is configured by a RRC signaling.

3. The method of claim 1, the reporting beam set is determined based on the candidate beam set comprising:
the reporting beam set is determined by an indication of a reporting beam set in the report.

4. The method of claim 3, wherein the reporting beam set is determined as the candidate beam set, in response to determining at least one of the following conditions is satisfied:
absence of the indication of a reporting beam set in the report that is configured by a RRC signaling or indicated in a MAC CE; or
the first number is equal to a predefined number.

5. The method of claim 3, wherein the indication of the reporting beam set in the report comprises:

a list of beam state indicators each indicating a beam state in the candidate beam set.

6. The method of claim 5, wherein a number of the beam indicator in the list of beam indicator is equal to the second number.

7. The method of claim 1, wherein the indication of the candidate beam set comprises the first number of the beam states for a CC or a CC group in a third number of Component Carriers (CCs), wherein the third number is a positive integer.

8. The method of claim 7, further comprising:
determining, by the wireless communication device, the second number of the power-related information for a CC, each power-related information for the CC corresponding to a beam state in a reporting beam set for the CC determined based on the candidate beam set of the CC or of the CC group comprising the CC; and
sending, by the wireless communication device to the network, a report comprising the power-related information for the CC.

9. The method of claim 8, wherein the report comprises an indication of reporting beam set for the CC.

10. The method of one of claim 8, wherein the number of field of MPE for a CC is determined according to the number of beam states in the reporting beam set for the CC.

11. The method of claim 1, wherein the beam state comprises reference signal (RS) information.

12. The method of claim 2, wherein the MPE comprises a power management-maximum power reduction (P-MPR).

13. A wireless communication method, comprising:
sending, by a network to a wireless communication device, an indication of a candidate beam set comprising a first number of beam states; and
receiving, by the network from the wireless communication device, a report comprising a second number of power-related information, wherein each of the power-related information corresponds to a beam state in a reporting beam set determined based on the candidate beam set, and wherein at least one of the first number and the second number is a positive integer.

14. A wireless communication device, comprising:
at least one processor configured to:
receive, via a transceiver from a network, an indication of a candidate beam set comprising a first number of beam states;
determine a second number of power-related information, each of which corresponds to a beam state in a reporting beam set determined based on the candidate beam set; and
send, via the transceiver to the network, a report comprising the power-related information, wherein at least one of the first number or the second number is a positive integer.

15. A network node, comprising:
at least one processor configured to:
send, via a transceiver to a wireless communication device, an indication of a candidate beam set comprising a first number of beam states; and
receive, via the transceiver from the wireless communication device, a report comprising a second number of power-related information, wherein each of the power-related information corresponds to a beam state in a reporting beam set determined based on the candidate beam set, and wherein at least one of the first number and the second number is a positive integer.

* * * * *